(12) United States Patent
Matsumoto

(10) Patent No.: US 6,898,158 B2
(45) Date of Patent: May 24, 2005

(54) INFORMATION RECORDING MEDIUM AND INFORMATION RECORDING AND REPRODUCING SLIDER

(75) Inventor: Koji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/676,425

(22) Filed: Oct. 1, 2003

(65) Prior Publication Data

US 2004/0062153 A1 Apr. 1, 2004

Related U.S. Application Data

(62) Division of application No. 09/631,371, filed on Aug. 2, 2000, now Pat. No. 6,687,197.

(30) Foreign Application Priority Data

Sep. 20, 1999 (JP) .......................................... 11-265640

(51) Int. Cl.$^7$ .............................................. G11B 11/00
(52) U.S. Cl. ............................... 369/13.38; 369/13.53; 428/141
(58) Field of Search .......................... 369/13.38, 13.53, 369/13.02, 13.17, 13.45, 13.14, 13.4, 13.2, 13.06, 13.5; 428/141, 64.1, 64.3, 64.2, 694 ML, 694 EC (56) References Cited

U.S. PATENT DOCUMENTS

| 4,797,316 A | 1/1989 | Hecq et al. |
| 5,008,176 A | 4/1991 | Kondo et al. |
| 5,561,089 A | 10/1996 | Ishizaki et al. |
| 5,580,633 A | 12/1996 | Kuwahara et al. |
| 5,757,734 A * | 5/1998 | Nakajima et al. ........ 369/13.15 |
| 6,127,017 A | 10/2000 | Hirata et al. |
| 6,177,175 B1 | 1/2001 | Hashimoto |

FOREIGN PATENT DOCUMENTS

| JP | 58165306 | 9/1983 |
| JP | 5217226 | 8/1993 |
| JP | 5325283 | 12/1993 |
| JP | 2550633 | 8/1996 |
| JP | 991660 | 4/1997 |
| JP | 11102510 | 4/1999 |

\* cited by examiner

*Primary Examiner*—Ali Neyzari
(74) *Attorney, Agent, or Firm*—Greer, Burns & Crain, Ltd.

(57) ABSTRACT

An information recording medium including an information recording film made of an exchange-coupled multilayer film capable of magnetically reproducing a recorded information, wherein the exchange-coupled multilayer film has a coercive force which is not substantially changed at a temperature ranging from room temperature to approximately 65° C., the product of 55 Gauss $\mu$m or more of a remnant magnetic flux density and a film thickness, and includes at least a transition metal-rich rare earth-transition metal amorphous alloy layer and a rare earth-rich rare earth-transition metal amorphous layer.

5 Claims, 6 Drawing Sheets

INFORMATION RECORDING MEDIUM AND INFORMATION RECORDING AND REPRODUCING SLIDER

CROSS-REFERENCE TO RELATED APPLICATION

This is a divisional, continuation-in-part, of application Ser. No. 09/631,371, filed Aug. 2, 2000 now U.S. Pat. No. 6,687,197.

This application is related to Japanese application No. HEI 11(1999)-265640 filed on Sep. 20, 1999 whose priority is claimed under 35 USC § 119, the disclosure of which is incorporated by reference in its entirety.

BACKGROUND OF THE INVENTION

1. Field of the Invention

The present invention relates to an information recording medium and an information recording and reproducing slider and, more particularly, to an information recording medium which is improved in recording/reproducing characteristics according to which information is magnetically recorded and reproduced, as well as to an information recording and reproducing slider suited to recording and reproduction of information on and from the information recording medium.

2. Description of Related Art

Optical recording media such as DVDs and magnetic recording media such as HDDs have been known and have gained popularity as information recording media. In addition, since it has been desired to enhance the recording density of information, research has been made into magneto-optical (MO) recording media in which the merits of optical recording media and the merits of magnetic recording media are combined.

According to an information recording/reproducing method of magnetically detecting information recorded on a magnetic material of the magnetic recording medium or the magneto-optical recording medium among the above-described recording media, as the result of more advanced research, it has become possible to record information at ultrahigh density. It has presently been proved that there is a possibility of ultrahigh-density recording exceeding 10 Gbits/(inch)$^2$.

A polycrystalline magnetic material, such as $CO_{77}Cr_{15}P$ $Ta_2$, which has an easy axis of magnetization in an in-plane direction is normally used as such a magnetic material.

Use of a perpendicular magnetization film made of a rare earth-transition metal amorphous alloy as the magnetic material of the magnetic recording medium is described in Japanese Unexamined Patent Publication No. SHO58 (1983)-165306. This rare earth-transition metal amorphous alloy is used as a magnetic material for magneto-optical recording media, and magneto-optical recording media having a laminated body of rare earth-transition metal amorphous alloys having different magnetic characteristics have recently been described in Japanese Unexamined Patent Publication Nos. HE15(1993)-217226, HE15(1993)-325283, SHO63(1988)-302448 and the like.

Among them, Japanese Unexamined Patent Publication No. SHO63(1988)-302448 describes a magneto-optical recording medium having a laminated body in which a so-called rare earth (RE) rich film exhibiting the magnetic moment of rare earth metal larger than that of transition metal is exchange-coupled to a so-called transition metal (TM) rich film exhibiting the magnetic moment of transition metal larger than that of rare earth metal.

More specifically, a description is made of a magneto-optical recording medium in which a TbFeCo film having a larger Kerr rotation angle is used as the TM rich film and a TbFeCo film capable of providing a large signal level ($\sqrt{R}\cdot\theta$:R=reflectance, $\theta$=Kerr rotating angle) is used as the RE rich film, and both films are exchange-coupled to each other. It is stated that this medium has advantages in that a large SNR can be obtained because a rise in noise level can be restrained, and that writing energy can be made small. In other words, it can be considered that if the medium described in this publication is used as a medium such as a MO disk, recording noise can be reduced while retaining a large magneto-optical effect.

To improve the recording density to a further extent, noise which occurs in an information recording medium needs to be reduced to a further extent. To this end, the grain size of magnetic grains (crystal grains) must be made approximately 10 nm.

However, if the grain size of the crystal grains of the above-described polycrystalline magnetic material is made approximately 10 nm, the resulting magnetic domains (recorded bits) become thermally unstable at, in particular, the interfaces of the crystal grains. This fact causes problems that noise is produced in the information recording medium, recorded information disappears and the like. In particular, the adoption of such minute magnetic grains causes the problem that the coercive force of the information recording medium becomes lower with a temperature rise (normally, the temperature inside a drive in use becomes approximately 65° C.).

In addition, it cannot be said that the medium described in the above-cited Japanese Unexamined Patent Publication No. SHO63(1988)-302448 is appropriate for a method of reproducing magnetic flux. For example, in Example 1 of this publication, a description is made of a medium formed of a laminated body of a magnetic film of Hc=2 kOe (thickness=20 nm) and a magnetic film of Hc=10 kOe (thickness=60 nm). This medium has the coercive force substantially larger than that recordable by a normal magnetic head, and thus the recording is difficult.

In addition, it is in general necessary that the magnetization of a medium be large to an extent detectable by a magnetic head.

In the case of the medium of the above-cited publication, it is inferred that the magnetization of the magnetic film of Hc=2 kOe is comparatively large and the magnetization of the magnetic film of Hc=10 kOe is comparatively small. Total magnetization is the sum of the values of magnetization of magnetic films which constitute a medium. However, in the case of the medium of the above-cited publication, since the film having a larger magnetization is thin, its total magnetization is very small and the medium does not emit magnetic flux to the outside, so that detection by a magnetic head is difficult.

SUMMARY OF THE INVENTION

According to the present invention, there is provided a first information recording medium comprising an information recording film formed on a base on which regular depressions and projections having Ra of 0.1 to 1.5 nm or period of 10–40 nm have been formed, the information recording film containing as a major component a rare earth-transition metal amorphous alloy capable of magnetically reproducing a recorded information.

In addition, according to the present invention, there is provided a second information recording medium comprising an information recording film made of an exchange-coupled multilayer film capable of magnetically reproducing a recorded information, wherein the exchange-coupled multilayer film has a coercive force which is not substantially changed at a temperature ranging from room temperature to approximately 65° C., the product of 55 Gauss μg or more of a remnant magnetic flux density and a film thickness, and includes at least a transition metal-rich rare earth-transition metal amorphous alloy layer and a rare earth-rich rare earth-transition metal amorphous layer.

Furthermore, according to the present invention, there is provided a slider for recording and reproducing information used for recording or reproducing on or from above information recording medium, the slider comprising a light irradiating means, a recording head and a magnetic reproducing head that are integrated, the light irradiating means being located ahead of the recording head and the magnetic reproducing head in the direction of information recording and reproducing.

These, and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

A first information recording medium according to the present invention will be described below.

In order to realize ultrahigh-density recording by a method which allows a magnetic recording and reproducing method, the inventor of the present invention has made an examination of the use of, as an information recording film, a rare earth-transition metal amorphous alloy which has great magnetic anisotropy and does not have crystal grains. It is known that this amorphous alloy has a strong exchange coupling force in the interior of the film. For this reason and since a recording head employing a thin-film coil, which has been used in existing recording and reproducing apparatuses, has large head dimensions and hence has difficulty in generating a sufficient magnetic field, it has been considered that it is difficult to form very small recording marks by such a recording head. In addition, since the amorphous alloy has the property that the coercive force becomes smaller when the exchange coupling force is made smaller, it has been considered that stability of the recording marks deteriorates. For this reason, it has not been general to use the amorphous alloy for the information recording medium.

Figure 1:
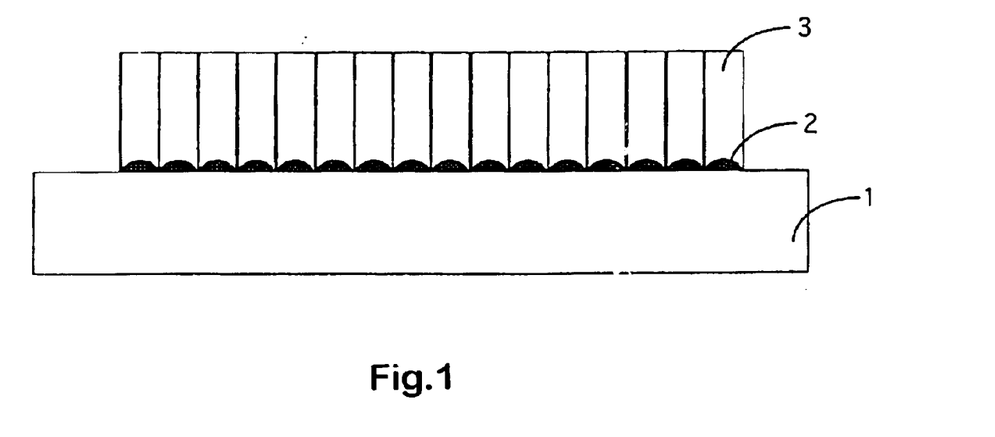
FIG. 1 is a schematic sectional view illustrating an information recording medium according to the present invention.

However, the inventor has made a detailed investigation into recording characteristics of an information recording medium in which the rare earth-transition metal amorphous alloy was used as the information recording film, the structure of the information recording film and the like, and found out unexpectedly that if appropriate depressions and projections are formed on a base below the information recording film, an appropriate column structure is formed in the interior of the magnetic film as shown in FIG. 1. In FIG. 1, reference numerals 1, 2 and 3 denote the base, a underlying layer and the information recording film, respectively. Moreover, the inventor has found out that the information recording film having this column structure enables very small recording marks to be formed even with a prior art magnetic head and can also provide a large reproduced signal. Thus, the inventor has attained the present invention.

The information recording medium of the present invention includes at least a base and an information recording film located over the base.

Any base known to those skilled in the art can be used as long as regular depressions and projections having a predetermined Ra or period are formed on the base. Concretely, the base may be a substrate made of glass, ceramics, titanium, silicon, carbon or the like on which regular depressions and projections are formed, a base on which an underlying layer having regular depressions and projections is formed, or the like. Incidentally, in the case where the underlying layer is to be formed, a resin substrate such as a polycarbonate substrate may be used as the substrate.

The method of forming the regular depressions and projections on the substrate may be a so-called mechanochemical polishing method in which the substrate is dipped in an acid such as hydrochloric acid and polished by using a polishing agent of predetermined particle size (for example, $Al_2O_3$, SiC or SiO).

The regular depressions and projections of the underlying layer may be formed at the same time as the formation of the underlying layer, or may be formed in a separate step after the underlying layer has been formed. In the case where the regular depressions and projections are to be formed at the same time as the formation of the underlying layer, it is necessary to select a material which enables the regular depressions and projections on the layer to be spontaneously formed into a predetermined shape as lamination of the layers proceeds, for example, by a sputtering method. Such a material may be an alloy such as NiP, NiB or CrMo, or a metal such as Cr or Ti. In the case where the regular depressions and projections are to be formed in a step separate from the formation of the underlying layer, the material of the underlying layer is not particularly limited. A method of forming the regular depressions and projections on the underlying layer may be, for example, the mechanochemical polishing method. To reduce the manufacturing processes, it is preferable to form the regular depressions and projections and the underlying layer at the same time.

Incidentally, a NiP film formed by sputtering method has the advantage in that its particle size is small.

In the case where NiP is used for the underlying layer, the composition of NiP is not particularly limited. For example, representative compositions are Ni:P=4:1, 3:1, 2:1 and 5:4. However, if a film which is excessively rich in Ni is used as the underlying layer, there occurs the problem that Ni is precipitated and the underlying layer becomes a ferromagnetic material. If the underlying layer becomes the ferromagnetic material, an magnetostatic interaction between the underlying layer and the information recording film might possibly occur and exert an influence on a recording/reproducing magnetic field. For this reason, the composition of NiP is preferably Ni:P=4-2:1. Normally, the composition of CrMo is Cr:Mo=approximately 90:10.

The specific shape of the regular depressions and projections is 0.1–1.5 nm in Ra or 10–40 nm in period.

It is not preferable that Ra is smaller than 0.1 nm, because the column structure is not easily formed in the information recording film. It is not preferable that Ra is larger than 1.5 nm, because the size of one column becomes large and noise easily occurs. A more preferable Ra is 0.2–1.2 nm. As the thickness of the underlying layer is made larger, Ra can be made larger, whereas as the thickness of the underlying layer is made smaller, Ra can be made smaller.

Incidentally, in the present specification, Ra is a value obtained in conformity to JIS (Japanese Industrial Standards) Surface Roughness (B 0601). Specifically, a portion of measurement length L is extracted from a roughness curve in the direction toward the center line thereof, and representing the center line of this extracted portion by the X-axis, the direction of axial magnification by the Y-axis, and the roughness curve by y=f(x). Ra means a value obtained by representing a value obtained from the following equation by nm.

$$Ra = \frac{1}{l} \int_0^l |f(x)| dx$$

In addition, it is not preferable that the period is smaller than 10 nm, because the column structure is not easily formed. It is not preferable that the period is larger than 40 nm, because the column structure becomes larger. A more preferable period is 15–25 nm. In the case where the underlying layer is to be formed by sputtering method, the period can be controlled by adjustment of applied power, and if the applied power is made higher, the period becomes longer, whereas if the applied power is made lower, the period becomes shorter.

Incidentally, the thickness of the underlying layer is preferably 7–75 nm. It is not preferable that the thickness of the underlying layer is smaller than 7 nm, because the column structure is not easily formed. It is not preferable that the thickness of the underlying layer is larger than 75 nm, because the grain size of a column becomes excessively large.

The information recording film which includes as its major constituent the rare earth-transition metal amorphous alloy which enables recorded information to be magnetically reproduced is formed over the base having the above-described regular depressions and projections.

Rare earth-transition metal amorphous alloys usable in the present invention are, for example, TbFe, TbFeCr, TbFeCo, DyFeCo, GdCo, GdFe, TbCo, GdTbFe, GdTbFeCo and GdDyFeCo. The composition of these alloys is appropriately set so that the desired coercive force and saturation magnetization can be obtained. Among these alloys, TbCo, TbFe, TbFeCr, TbFeCo and DyFeCo are preferable.

The thickness of the information recording film is preferably 20–25 nm.

Furthermore, the information recording film of the present invention may be made of two or more layers utilizing the magnetic exchange coupling therebetween. For example, in the case where the information recording film is made of two layers, a magnetization inversion assisting layer may be provided below the information recording film made of any of the above-described rare earth-transition metal amorphous alloys. The magnetization inversion assisting layer can stabilize the recording marks. Moreover, the information recording film may have a recording layer and a reproducing layer so that the recording of information and the reproduction of information are separately performed. By this separation, the compositions of the respective films can be set so that their coercive force and saturation magnetization are suited to recording and reproduction.

The magnetization inversion assisting layer may be a perpendicular magnetization film or an in-plane magnetization film. In addition to the above-described amorphous alloys, a crystalline alloy such as CoCrTa can be used for the perpendicular magnetization film. Alloys such as GdFeCo and GdFe can be used for the in-plane magnetization film. The thickness of the magnetization inversion assisting layer is preferably 2–10 nm.

The above-described amorphous alloys can be used for the recording layer and the reproducing layer. Specific combinations are TbFe/TbFeCo, TbFe/DyFeCo, TbCo/TbFeCo and the like. The thicknesses of the recording layer and the reproducing layer are preferably 20–40 nm and 5–20 nm, respectively.

The method of forming the information recording film is not particularly limited, and any known method can be used. Among known methods, a sputtering method is preferably used to form the information recording film.

The information recording medium of the present invention may further have layers which constitute a normal information recording medium, such as a substrate protecting layer (for example, SiN or SiO), a surface protecting layer (for example, SiN or SiO) and a carbon layer for improving the sliding characteristics of a slider. In general, the substrate protecting layer is located between the substrate and the information recording film (if the underlying layer is present, between the underlying layer and the information recording film), the surface protecting layer is located on the information recording film, and the carbon layer is located a top of the information recording medium.

According to the information recording medium of the present invention, as compared with the case where no depressions and projections are formed on the base, it is possible to improve the SNR by 100% or more and the overwrite characteristic by 400% or more. This is considered to be due to the fact that very small recording marks can be stably formed owing to the column structure in the interior of the information recording film, which stems from the regular depressions and projections of the base.

The information recording medium of the present invention can be used as a magnetic recording medium, and also as a magneto-optical recording medium.

If the information recording medium of the present invention is used as the magneto-optical recording medium, it is possible to record information with a micro recording mark having a track width of, for example, 0.1–2.5 $\mu$m and a width of magnetization inverting portion of 0.1–2 $\mu$m this information can also be reproduced with a known magnetic reproducing head.

A second information recording medium of the present invention will be described below.

The coercive force of an in-plane magnetization film made of CoCrTaPt, which is generally used in an information recording medium, is 3 kOe at room temperature, but decreases to approximately 2.4 kOe at about 65° C. The coercive force of a perpendicular magnetization film made of CoCrPt, is 3 kOe at room temperature, but decreases to approximately 2.4 kOe at about 65° C. For this reason, it has been difficult to stably use these magnetization films at a temperature ranging from room temperature to about 65° C.

The inventor of the present invention has made an examination as to whether or not an information recording medium whose coercive force does not change with respect to temperature can be obtained with a rare earth-transition metal amorphous alloy film.

It is known that a rare earth-transition metal amorphous alloy which includes a rare earth element such as Tb or Dy has a particularly large perpendicular magnetic anisotropy.

Figure 7:
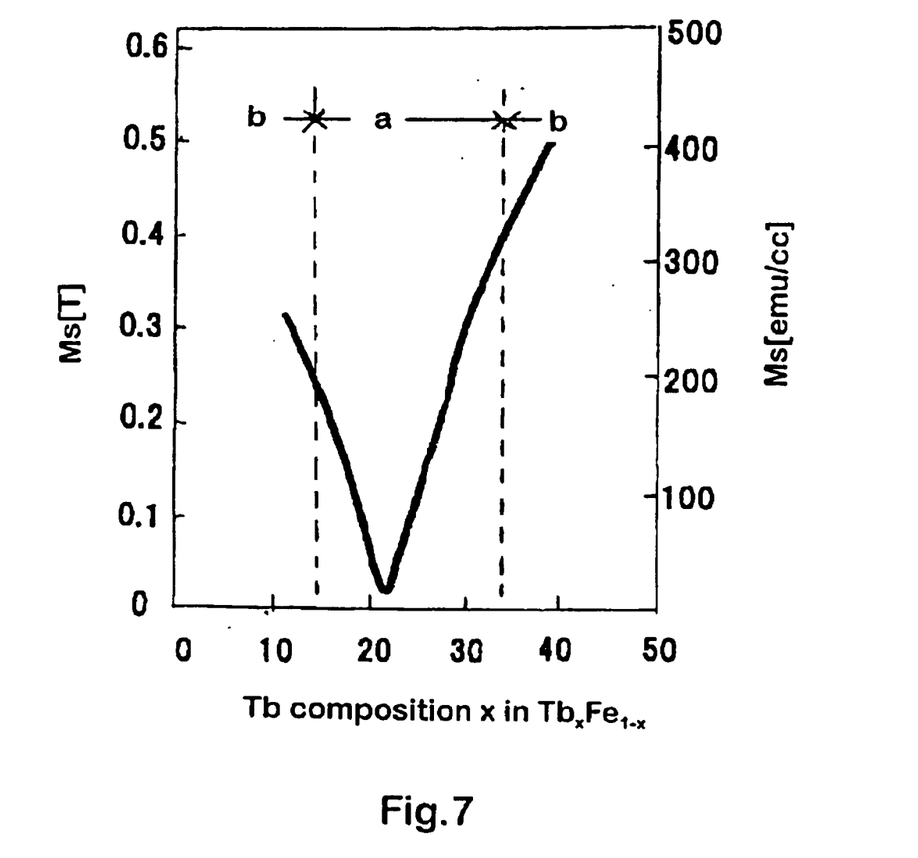
FIG. 7 is a graph illustrating a change in magnetization in accordance with the amount of Tb contained in TbFe.

Specifically, in the case of an alloy film of TbFe, if the composition of Tb is in the neighborhood of about 23%, as shown in FIG. 7, there exists a so-called compensation composition in which the value of saturation magnetization is zero. In the present specification, a region in which the content of Tb is larger than this compensation composition (i.e., a region in which the content of transition metal is smaller) is referred to as a rare earth (RE)-rich region, and a region in which the content of Tb is smaller than the compensation composition (i.e., a region in which the content of transition metal is larger) is referred to as a transition metal (TM)-rich region. In FIG. 7, symbol a denotes the range of perpendicular magnetic anisotropy, and symbol 1b denotes the range of in-plane magnetic anisotropy.

Although FIG. 7 shows only the value of saturation magnetization, in a composition which has the smallest value of saturation magnetization, the coercive force reaches infinity, and as the saturation magnetization deviates from that value, the coercive force decreases. This phenomenon similarly occurs not only with respect to the composition, but also with respect to the temperature. In other words, on the basis of the finding that a transition metal-rich rare earth-transition metal amorphous alloy layer exhibits a decrease in coercive force and a small increase in saturation magnetization value with a rise in temperature, whereas a rare earth-rich rare earth-transition metal amorphous alloy layer exhibits an increase in coercive force and a decrease in saturation magnetization value with a rise in temperature, the inventor of the present invention has exchange-coupled the alloy layers to form an exchange-coupled multilyered film in which saturation magnetization is determined to a predetermined value. Thus, the inventor has achieved the second information recording medium capable of keeping the coercive force and the saturation magnetization nearly constant and of stable recording and reproducing information.

The rare earth-transition metal amorphous alloy layer is made of, for example, TbFe, TbFeCr, TbFeCo, DyFeCo, GdCo, GdFe, TbCo, GdTbFe, GdTbFeCo or GdDyFeCo. It is preferable that the alloy layer contains at least Tb or Dy. Among these alloys, TbCo, TbFe, TbFeCr, TbFeCo and DyFeCo are particularly preferable.

The composition and materials of the transition metal-rich rare earth-transition metal amorphous alloy layer and the rare earth-rich rare earth-transition metal amorphous alloy layer are appropriately selected so that recorded information can be magnetically reproduced, their coercive forces do not substantially change in the temperature range from room temperature to approximately 65° C. and the alloy layers have a tBr of 55 Gauss μm or more. Specific combinations of the transition metal-rich rare earth-transition metal amorphous alloy layers and the rare earth-rich rare earth-transition metal amorphous alloy layers are, for example:

in the case of $Tb_xCo_{1-x}$,
the combination of $14 \leq X \leq 22$ and $25 \leq X \leq 35$ (a units of mol %; the same is applied the following);
in the case of $Tb_xFe_{1-x}$,
the combination of $14 \leq X \leq 23$ and $25 \leq X34$;
in the case of $Tb_x(FeCr)_{1-x}$
the combination of $15 \leq X \leq 24$ and $26 \leq X \leq 36$;
in the case of $Tb_x(FeCo)_{1-x}$,
the combination of $14 \leq X \leq 23$ and $25 \leq X \leq 34$;
in the case of $Dy_x(FeCo)_{1-x}$,
the combination of $16 \leq X \leq 22$ and $24 \leq X \leq 33$.

The thicknesses of the transition metal-rich rare earth-transition metal amorphous alloy layer and the rare earth-rich rare earth-transition metal amorphous alloy layer differ according to the kinds of alloy layers to be used, but preferably in the range of 5–45 nm.

The method of forming the alloy layers is not particularly limited, and any known method can be used. Among known methods, a sputtering method is preferably used to form the alloy layers.

Incidentally, if the tBr is smaller than 50 Gauss μm, the SNR value decreases and it becomes difficult to record and reproduce information. A more preferable tBr is in the range of 57–135 Gauss μm.

The above-described two alloy layers are normally formed over the base. Either of the transition metal-rich rare earth-transition metal amorphous alloy layer and the rare earth-rich rare earth-transition metal amorphous alloy layer may be formed to face the base.

As in the case of the first information recording medium, it is preferable that regular depressions and projections having a predetermined Ra or period are formed on the base. The kinds of bases which can be specifically used and the method of forming the regular depressions and projections on the base are similar to those used for the above-described first information recording medium.

As in the case of the first information recording medium, a magnetization inversion assisting layer may be provided between the substrate and the alloy layers, a substrate protecting layer may be provided between the substrate and the alloy layers (if the magnetization inversion assisting layer is formed, between the assisting layer and the substrate), and a surface protecting layer may be provided as the uppermost layer.

Similarly to the first information recording medium, the second information recording medium of the present invention can be used as a magnetic recording medium, and also as a magneto-optical recording medium.

If either of the first and second information recording media of the present invention is used as the magnetic recording medium, a recording and reproducing apparatus which records and reproduces information on and from the medium is not particularly limited, and any known apparatus can be used. For example, an information reproducing apparatus has at least a slider provided with a magnetic head. The magnetic head records and/or reproduces of information on and/or from the information recording medium. The magnetic head may be provided with separate heads for recording and reproduction such as a recording head and a magnetic reproducing head. If a thin-film coil for a magnetic disk, which is capable of high-speed transfer magnetic field inversion, is employed in the recording head, it is possible to realize high-density recording without degrading the transfer rate of the recording head.

If either of the first and second information recording media of the present invention is used as the magneto-optical recording medium, a recording and reproducing apparatus which records and reproduces information on and from this medium has, for example, a slider provided with a magnetic head and a light irradiating means. The light irradiating means irradiates the information recording medium with light to raise the temperature of the irradiated portion, thereby facilitating recording and reproduction of information. It also serves the role of making recording marks far smaller. It is preferable to use light emitted from a laser as the light for the irradiation, for example.

Figure 2:
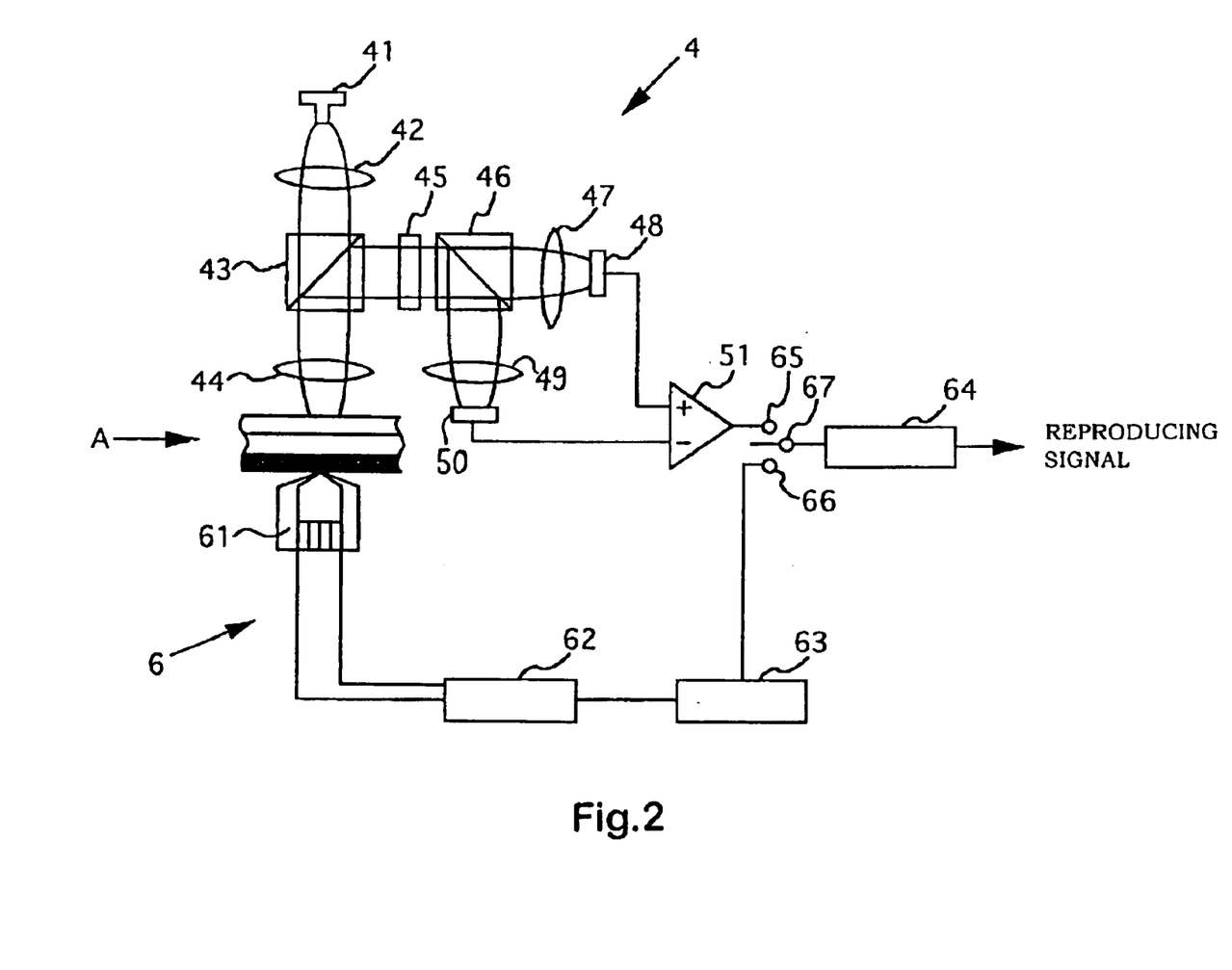
FIG. 2 is a schematic view illustrating a structure of a recording and reproducing apparatus.

FIG. 2 shows one example of the construction of a recording and reproducing apparatus having the above-described light irradiating means. Although the following description refers to the light irradiating means as a laser light irradiating means, the present invention is not limited to laser light, and can use various kinds of light. In FIG. 2, symbol A denotes an information recording medium, and reference numerals 4 and 6 denote a laser light irradiating means and a magnetic head part including a slider, respectively.

The laser light irradiating means 4 includes, if the laser light is used, a laser 41 which emits the laser light, a collimator lens 42 which collimates the laser light, a splitter 43 which transmits or reflects the laser light and an objective lens 44 disposed in this order toward the information recording medium A. Furthermore, on the reflection side of the splitter 43, a half-wave plate 45 which rotates the plane of polarization of the laser light, and a polarizing beam splitter 46 which separates the laser light into a horizontal component and a vertical component, are disposed in this order. Condenser lenses 47 and 49 which condense the output light of the horizontal component, and that of the vertical component, respectively, are disposed on the output side of the splitter 43 and photodetectors 48 and 50 are disposed on the output sides of the condenser lenses 47 and 49, respectively. An amplifier 51 which calculates the difference between detection signals obtained from these photodetectors 48 and 50 and amplifies the obtained difference is connected to the photodetectors 48 and 50. A signal output from the amplifier 51 is output to a switching terminal 65 of a switch part.

A magnetic head part 6 is provided with an amplifier circuit 62 which receives and amplifies an electrical signal corresponding to a magnetization direction detected by a slider 61 provided with a magnetic head, and an integrating circuit 63 which receives the amplified signal and shapes the waveform thereof. The signal from the integrating circuit 63 is output to a switching terminal 66. Either of the signals output to the switching terminals 65 and 66 is input to a demodulating circuit 64 by switching a common terminal 67 of the switch part and demodulated to be output signal.

Figure 3:
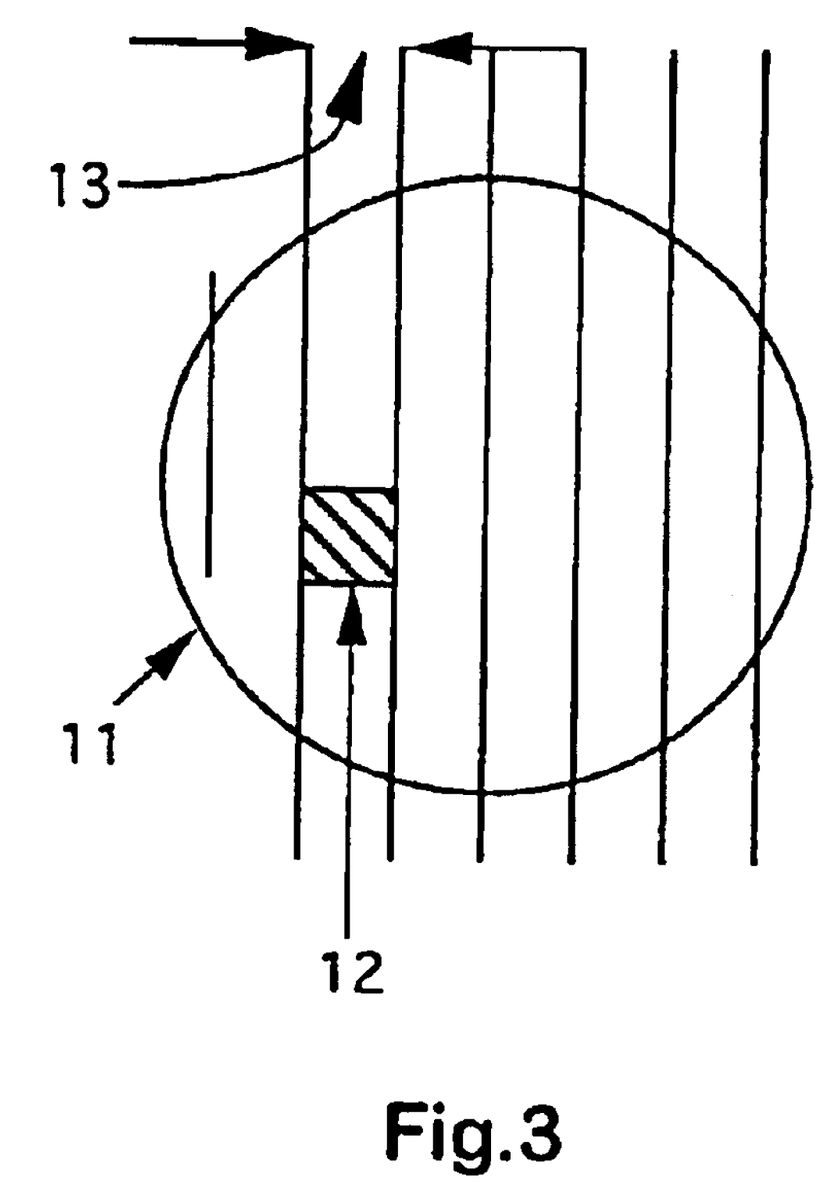
FIG. 3 is a plan view illustrating how information is recorded and/or reproduced.

According to the recording and reproducing apparatus shown in FIG. 2, the information recording medium A is irradiated with laser light from the laser light irradiating means 4 to heat the irradiated portion and bring the irradiated portion to a state in which information can be easily recorded and/or reproduced. Thus, information can be recorded and/or reproduced on and/or from the heated region by the magnetic head. A schematic diagram illustrating this recording and/or reproduction of information is shown in FIG. 3. In FIG. 3, reference numerals 11, 12 and 13 denote the heated region, the magnetic head and a track pitch, respectively.

Specifically, by irradiating laser light during the recording, the coercive force of the information recording film is made small, whereby a recording current can be made small. Further, it is possible to record information on a medium which has a large coercive force at room temperature. On the other hand, by irradiating laser light during the reproduction, the value of magnetization of the information recording film is made large, whereby the reproducing signal can be made large.

The present invention further provides an information recording and reproducing slider used for recording and/or reproducing information on and/or from the magneto-optical recording medium. The information recording and reproducing slider includes a laser light irradiating means integrated with the slider, a recording head and a magnetic reproducing head. The laser light irradiating means is positioned ahead of the recording head and the magnetic reproducing head in the direction of recording and reproduction of information.

Figure 4:
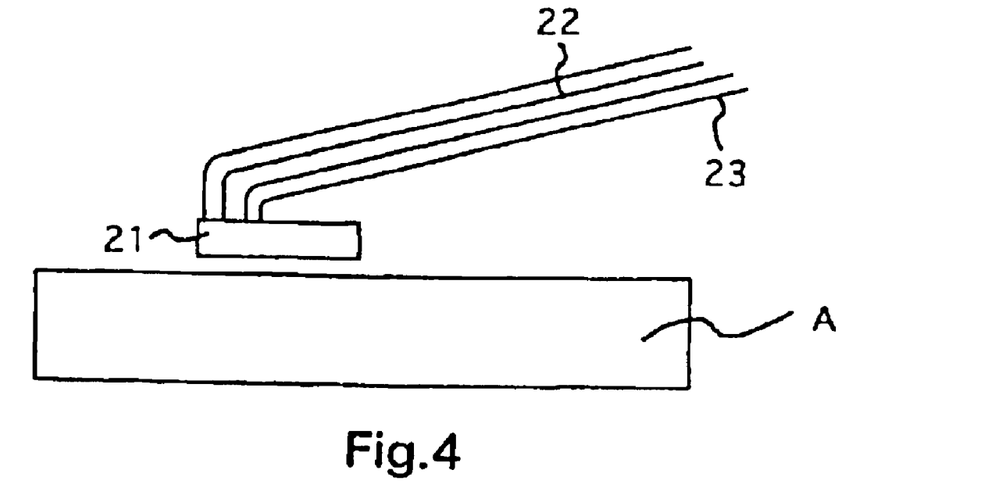
FIG. 4 is a schematic view illustrating a structure of a slider for recording and reproducing information according to the present invention.
Figure 5:
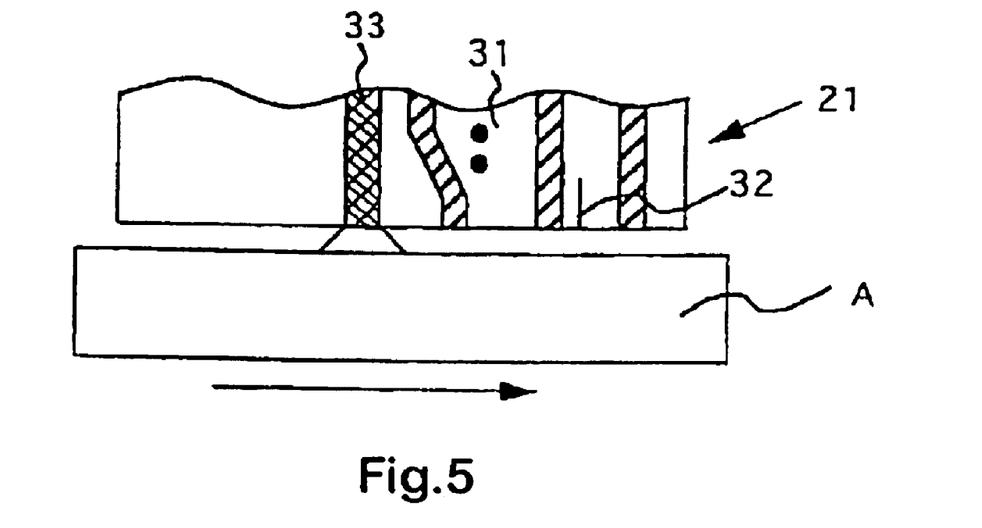
FIG. 5 is a schematic enlargement view illustrating a major part of the slider according to the present invention.
Figure 6:
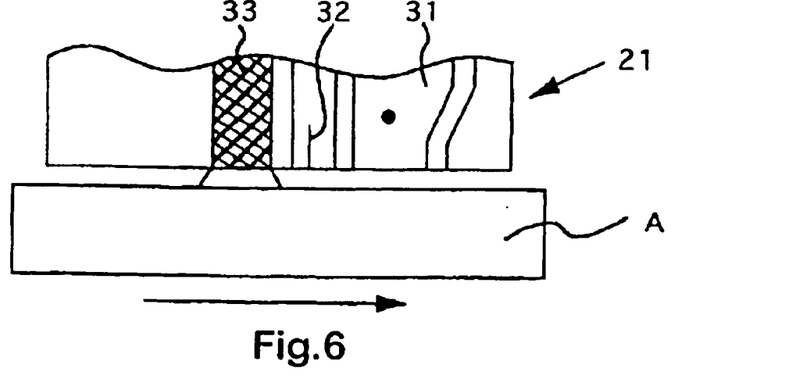
FIG. 6 is a schematic enlargement view illustrating a major part of the slider according to the present invention.

The slider has the construction shown in FIG. 4 by way of example. In FIG. 4, reference numerals 21, 22 and 23 denote the slider, a slider supporting means (for example, a spring) and a laser light irradiating means (for example, an optical fiber), respectively. FIGS. 5 and 6 each show a cross-sectional view of a major part of the slider. In FIGS. 5 and 6, reference numerals 31, 32 and 33 denote a recording head, a magnetic reproducing head and a laser light irradiating means, respectively. In FIGS. 5 and 6, the laser light irradiating means, the recording head and the magnetic reproducing head are integrated. The laser light irradiating means is positioned ahead of the recording head and the magnetic reproducing head in the direction of recording and reproduction of information (the direction of the arrow shown in the figures). Since the irradiated laser light flows backward as the slider moves forward and thus the temperature of the heated portion shows the same distribution as the light, the information can be effectively recorded and/or reproduced by arranging the recording head and the magnetic recording head behind the laser light irradiating means. In addition, since the laser light irradiating means, the recording head and the magnetic reproducing head are integrated, high-speed seek is possible as compared with a related-art apparatus in which a laser light irradiating means is separately disposed. The sliders shown in FIGS. 5 and 6 differ in the arrangement of the recording head and the magnetically reproducing head.

In addition, a heat radiation layer may be provided on the bottom side (a side facing to the medium) of the slider in order to prevent the recording head and the magnetic reproducing head from being degraded by a rise in temperature caused by the laser light. The head radiation layer preferably uses a material of good heat conductivity such as aluminum or copper.

The above-described recording and reproducing apparatus can be produced by forming, for example, an optical waveguide which includes $LiNbO_3$ as a core and a $SiO_2$ glass as a cladding formed on an AlTiC substrate as the laser light irradiating means, and forming the recording head and the magnetic reproducing head on the optical waveguide by known means.

EXAMPLES

Specific examples of the present invention will be described below, but the present invention is not at all restricted by any of the examples.

Example 1

A $Ni_3P$ underlying layer having a thickness varied in the range of 0–1.5 nm, a 2-nm-thick substrate protecting layer made of SiNx, a 50-nm-thick information recording film (magnetic film) made of $Tb_{15}Fe_{85}$ which is an amorphous alloy, a 3-nm-thick surface protecting layer made of SiNx, and a 3-nm-thick C (carbon) layer for improving the sliding characteristics of recording and reproducing heads were laminated in this order over a glass substrate of Ra<0.05 nm (hereinafter referred to as a super flat substrate) by a sputtering process, thereby forming an information recording medium. Specifically, each of the layers was formed under the following conditions:

magnetic film—sputtering gas: Ar
   sputtering gas pressure: 0.5 Pa
   applied power: 1 KW
underlying layer—sputtering gas: Ar
   sputtering gas pressure: 2 Pa
   applied power: 1 KW
substrate protecting layer and surface protecting layer
   sputtering gas pressure: Ar and $N_2$
     (gas mixture ratio: $Ar/N_2=7/3$)
     sputtering gas: 0.3 Pa
     applied power: 0.8 KW
C layer—sputtering gas: Ar
   sputtering gas pressure: 0.5 Pa
   applied power: 0.9 KW The magnetic film of the obtained information recording medium exhibited perpendicular magnetization and a coercive force of about 1 kOe.

Information of 200 kfci (equivalent to a mark length of 0.127 μm) was recorded on this information recording medium under the following conditions and SNR at this time was measured:

rotating speed: 4,500 rpm
magnetic head: write width —2.0 μm
   reproduction width —1.5 μm
   reproduction—MR head
   floating distance —30 nm.

In addition, under the same conditions, information of 70 kfci (equivalent to a mark length of 0.36 μm) was recorded on the information recording medium, and then information of 400 kfci (equivalent to a mark length of 0.064 μm) was overwritten to measure the characteristic (O/W characteristic) of unerased components of frequency equivalent to the information of 70 kfci. In addition, the Ra of the underlying layer was measured. The results are shown below.

layer was made large, it was possible to improve the SNR and the O/W characteristic. In particular, when the range of Ra was 0.1–1.5 nm, improvements in SNR and O/W characteristic were remarkable.

The reason for the improvements in SNR and O/W characteristic seems to be that in a system which magnetically reproduces information recorded on a magnetic film made of a rare earth-transition metal amorphous alloy, the exchange coupling force in the magnetic material lowers to an extent that information can be accurately recorded/reproduced if adequate depressions and projections are formed on a base which forms the magnetic film.

Example 2

Although in Example 1 the SNR and the O/W characteristic relative to the Ra of the underlying layer were examined, in Example 2, the SNR and the O/W characteristic were examined on a medium in which regular depressions and projections were directly formed on a glass substrate.

Information recording media were formed in a manner similar to that used in Example 1, except that the super flat substrate used in Example 1 was dipped in hydrochloric acid and then subjected to mechanochemical polishing to form various patterns of Ra values on the substrate. In a manner similar to that used in Example 1, the SNR and the O/W characteristic relative to Ra were measured. The results are shown below.

| Ra (nm) | 0.05, | 0.15, | 0.23, | 0.55, | 0.73, | 0.90 |
|---|---|---|---|---|---|---|
| SNR (dB) | 11.5, | 15.4, | 17.9, | 21.7, | 22.5, | 22.1 |
| O/W (dB) | −10, | −23, | −39, | −41, | −43, | −42 |

The above results show that it was possible to obtain results similar to those of Example 1 by forming the regular depressions and projections on the substrate.

Example 3

At present, crystalline magnetic bodies made of CoCrPtTa (for example, $CO_{77}Cr_{15}Pt_6Ta_2$) are widely used as magnetic films in magnetic recording media. In this composition, Cr is used for promoting isolation of magnetic particles (physical separation of magnetic crystal grains).

An attempt at the addition of Cr to a rare earth-transition metal amorphous alloy film has been made in order to

| thickness of underlying layer (nm) | 0, | 8, | 10, | 20, | 30, | 40, | 50, | 60, | 75, | 80 |
|---|---|---|---|---|---|---|---|---|---|---|
| Ra (nm) | 0.05, | 0.10, | 0.15, | 0.23, | 0.05, | 0.73, | 0.90, | 1.20, | 1.50, | 1.70 |
| SNR (dB) | 11.5, | 14.2, | 15.8, | 18.9, | 21.2, | 22.0, | 22.2, | 18.9, | 16.2, | 12.8 |
| O/W (dB) | −10, | −26, | −38, | −42, | −42, | −43, | −43, | −42, | −35, | −12 |

In the case where no underlying layer was formed, a mark of accurate 1 μm was not able to be recorded on the magnetic film although a magnetic field of about 3 kOe was applied by supplying a current of 60 mA to the magnetic head. This is considered to be due to the fact that since the exchange coupling force in the magnetic material is large and the direction of magnetization easily assumes one direction. It was found out, therefore, that when Ra was small, it was difficult to accurately form a mark on the magnetic film by the magnetic head. Contrarily, when the Ra of the underlying improve the chemical stability of the magnetic film. In this case, since Cr is uniformly dispersed in the magnetic material of the rare earth-transition metal, and the film structure is amorphous, it has been generally considered that Cr does not have an action as shown in the above crystalline magnetic recording medium. In Example 3, examination was made of recording and reproducing characteristics obtained in the case where Cr was added to TbFe formed on a underlying layer on which adequate depressions and projections were formed.

Specifically, information recording media were formed in a manner similar to that used in Example 1, except that $(Tb_{15}Fe_{85})_{100-x} \cdot Cr_x$ was used for the magnetic film and a NiP layer of 30-nm-thick (Ra:0.55) was used for the underlying layer, and variations in SNR with respect to x were measured. SNR was measured in a manner similar to that used in Example 1. The results are shown below.

| Cr content (atom %) | 0, | 3, | 7, | 9, | 12 |
|---|---|---|---|---|---|
| SNR (dB) | 21.2, | 22.0, | 22.5, | 23.1, | 23.2 |

From the above results, it has been found out that SNR can be improved to a further extent by adding a nonmagnetic element such as Cr to an amorphous alloy.

Example 4

In the above-described examples, examinations were made into the rare earth-transition metal amorphous alloys which included TbFe as their major constituents, whereas in Example 4, an examination was made into a different alloy.

Specifically, information recording media were formed in a manner similar to that used in Example 3, except that $Tb_{15}Fe_{85-x}Co_x$ was used for the magnetic film, and variations in SNR with respect to x were measured. SNR was measured in a manner similar to that used in Example 1. The results are shown below.

| Co content (atom %) | 0, | 10, | 20, | 30, | 35 |
|---|---|---|---|---|---|
| SNR (dB) | 21.2, | 22.0, | 23.0, | 24.2, | 24.5 |

From the above results, it has been found out that SNR can be improved to a further extent by adding Co to an amorphous alloy. This is considered to be due to the fact that as the value of saturation magnetization of the magnetic film increases, the level of a reproducing signal increases.

Example 5

An examination was made into another different alloy film of RE-rich DyFeCo which. DyFeCo is smaller in perpendicular magnetic anisotropy but lager in saturation magnetization value than TbFe, and accordingly there is a possibility that DyFeCo can provide a far larger signal. Furthermore, the RE-rich DyFeCo is considered to be resistive to a temperature rise because the coercive force increases even if ambient temperature rises.

Specifically, an information recording medium was formed in a manner similar to that used in Example 3, except that RE-rich $Dy_{25}Fe_{45}CO_{30}$ was used for the magnetic film. The coercive force of this magnetic film was about 2 kOe and the compensation temperature at which the coercive force reached infinity was about 130° C. SNR at 200 kfci was 24.5 dB. This result was approximately the same as that of $Tb_{15}Fe_{55}CO_{30}$ of Example 4.

Then, variations in SNR of $Dy_{25}Fe_{45}CO_{30}$ and $Tb_{15}Fe_{55}CO_{30}$ with respect to a temperature rise were measured. Specifically, information was recorded in a manner similar to that used in Example 1, and measurement was performed on the SNR of the information recording medium after heating the information recording medium to a predetermined temperature and then cooling to a room temperature. The results are shown below.

| heating temperature (° C.) | 20, | 40, | 50, | 60, | 70, | 80 |
|---|---|---|---|---|---|---|
| $Tb_{15}Fe_{55}Co_{30}$ | 24.2, | 24.2, | 24.0, | 23.5, | 23.2, | 22.9 |
| $Dy_{25}Fe_{45}Co_{30}$ | 24.5, | 24.5, | 24.4, | 24.4, | 24.4, | 24.4 |

From the above results, it has been found out that RE-rich magnetic film is very effective against the temperature rise.

Example 6

In Example 6, examination was made of recording and reproducing characteristics obtained in the case where magnetic films having different magnetic characteristics were exchange-coupled to each other.

Specifically, an information recording medium was formed in a manner similar to that used in Example 3, except that used was a magnetic film made of a laminated body of a 15-nm-thick TbFe layer and a 35-nm-thick TbFeCo layer were laminated in this order from the underlying layer. The composition of TbFe was determined to $Tb_{22}Fe_{78}$ so as to have an approximate compensation composition, small magnetization and large coercive force, whereas that of TbFeCo was determined to $Tb_{12}Fe_{50}CO_{38}$ so as to have small coercive force and a large saturation magnetization value. (The former layer mainly serves the role of a recording layer, and the latter layer the role of a reproducing layer.)

The SNR of the obtained information recording medium was measured in a manner similar to that used in Example 1. The SNR was 24.6 dB which was better than that of the TbFeCo single-layer film of Example 4

Further, an information recording medium was formed in a manner similar to the above-described manner, except that a laminated body in which $Tb_{24}Fe_{76}$ and $Dy_{22}Fe_{45}CO_{33}$ were laminated in this order from the underlying layer was exchange-coupled. The SNR of this information recording medium was 25.1 dB which was better than that of the $Dy_{25}Fe_{45}CO_{30}$ single-layer film of Example 5, similarly to the case of the above-described laminated body of TbFe and TbFeCo.

From the above results, it has been found that even in the magnetic recording medium, it is possible to obtain SNR characteristics unobtainable with the single-layer film, by exchange-coupling rare earth-transition metal amorphous alloys.

Example 7

In Example 7, examination was made of recording and reproducing characteristics obtained in the case where a perpendicular magnetization film and an in-plane magnetization film were exchange-coupled to each other.

Specifically, an information recording medium was formed in a manner similar to that used in Example 3, except that a laminated body in which a 15-nm-thick GdFeCo layer (in-plane magnetization film) and a 35-nm-thick DyFeCo layer (perpendicular magnetization film) were laminated in this order from the underlying layer was exchange-coupled. $Gd_{35}Fe_{50}Co_{15}$ was used as the GdFeCo film, which was RE-rich and saturated in magnetization at about 3 kOe and had almost no coercive force when a magnetic field was applied in the direction perpendicular to the surface of the GdFeCo film. In addition, $Dy_{25}Fe_{45}CO_{30}$ was used as the DyFeCo film.

When information of 200 kfci was recorded on the obtained information recording medium with a recording current of 30 mA, a sufficiently high SNR of 25.5 dB was obtained.

On the other hand, in the case of an information recording medium formed in a manner similar to the above-described manner, except that no in-plane magnetization film was formed (i.e., the magnetic film was made of only DyFeCo), the recording current required to obtain an SNR value of approximately 25 dB in order to record information of 200 kfci was 50 mA.

From the above results, it has been found that by incorporating the in-plane magnetization film as a magnetization inversion assisting layer, magnetization inversion is assisted and recording magnetic field sensitivity can be improved.

Example 8

An information recording medium in which the constructions of Examples 6 and 7 were combined, i.e., a magnetic film including a layer having large coercive force and small saturation magnetization, a layer having small coercive force and large saturation magnetization, and a magnetization inversion assisting layer (reproducing layer/recording layer/magnetization inversion assisting layer), was fabricated.

Specifically, an information recording medium was formed in a manner similar to that used in Example 3, except that a laminated body in which a 10-nm-thick $Gd_{35}Fe_{50}Co_{15}$ layer, a 10-nm-thick $Tb_{24}Fe_{16}$ layer and a 35-nm-thick $Dy_{22}Fe_{45}CO_{33}$ layer were laminated in this order from the underlying layer, was used as the magnetic film.

From this information recording medium, it was possible to obtain an SNR value of 25.7 dB with respect to a signal of 200 kfci with a current of 30 mA. From this result, it has been found that the construction of reproducing layer/recording layer/magnetization inversion assisting layer improves the SNR to a further extent.

Example 9

Although the above-described magnetic films were formed under the same conditions, the size (i.e., Ra) of the regular depressions and projections of their underlying layers may slightly vary according to the sputtering conditions of the magnetic films. In Example 9, information recording media were formed by changing the sputtering gas pressure among the conditions for forming the magnetic film.

Specifically, information recording media were formed in a manner similar to that used in Example 1, except that the sputtering gas pressure was made 1.0 Pa. The SNRs of the obtained information recording media were measured in a manner similar to that used in Example 1. The results are shown below together with the results in Example 1.

| thickness of underlying layer (nm) | 0, | 10, | 20, | 30, | 40, | 50 |
|---|---|---|---|---|---|---|
| SNR (dB) | 11.5, | 15.8, | 18.9, | 21.2, | 22.0, | 22.2 (for 0.5 Pa) |
| SNR (dB) | 11.5, | 17.5, | 19.2, | 22.2, | 23.0, | 23.2 (for 1.0 Pa) |

It has been found that the film structure in the magnetic film induced by the regular depressions and projections of the underlying layer is very important in improving SNR, although recording characteristics are not directly determined with respect to the Ra of the underlying layer of a magnetic film.

Example 10

In Example 10, SNR relative to the irregularity period of the underlying layer was examined.

Specifically, information recording media were formed in a manner similar to that used in Example 1, except that the periods of their regular depressions and projections were varied while the Ra values of the regular depressions and projections kept nearly constant, by changing applied power during the formation of their underlying layers (NiP layers). The SNRs of the obtained information recording media were measured in a manner similar to that used in Example 1. The results are shown below.

| applied power (KW): | 0.4, | 0.7, | 1, | 1.4, | 2.1, | 2.9 |
|---|---|---|---|---|---|---|
| irregularity period (nm): | 6, | 10, | 20, | 30, | 40, | 50 |
| SNR (dB): | 12.0, | 16.3, | 18.9, | 19.2, | 17.5, | 12.4 |

From the above results, it has been found that the period of a column structure of a magnetic film formed on a underlying layer increases or decreases by increasing or decreasing the period of the regular depressions and projections of the underlying layer, and a period of 10–40 nm is suited to the recording of information.

Example 11

Although reproduction was performed at room temperature in Examples 1 to 10, the magnetization of a magnetic film may possibly increase by raising temperature. In particular, in the case of the rare earth-transition metal amorphous alloys, it is possible to skillfully change magnetic characteristics with respect to temperature.

In Example 11, a temperature variation was applied to the magnetic film of exchange coupled $Tb_{24}Fe_{76}$ and $Dy_{22}Fe_{45}CO_{33}$ used in Example 7 to increase the magnetization of $Tb_{24}Fe_{76}$, whereby reproduction with a large reproducing signal was performed.

In this example, the recording and reproducing apparatus shown in FIG. 2 was used. In the apparatus shown in FIG. 2, laser light irradiated in diameter of about 15 μm, which was hardly narrowed, was used as means for raising temperature during reproduction. Temperature in a region irradiated with the laser light was entirely raised.

By varying the power of the laser light, the following variations in SNR were observed with respect to the variation in power. The following results are values obtained when information of 200 kfci was recorded.

| irradiation power (mW) | 0, | 5, | 10, | 15, | 20 |
|---|---|---|---|---|---|
| SNR (dB) | 25.1, | 25.5, | 26.1, | 26.6, | 25.5 |

From the above results, it has been found that SNR can be improved to a further extent by heating the magnetic film. Incidentally, the reason why SNR lowers at 20 mW is that a recorded signal starts to be erased.

Example 12

Although Example 11 used the recording and reproducing apparatus in which the recording and reproducing heads and the laser light irradiating means are separately constructed, Example 12 used a recording and reproducing apparatus provided with a recording head, a reproducing head and a laser light irradiating means that were integrated. More specifically, the laser light irradiating means includes a laser light generating device and an optical waveguide, and is positioned ahead of the recording head and the reproducing head in the recording and reproducing direction. In this recording and reproducing apparatus, a positional relationship among a laser light emitting point. The recording head and the reproducing head do not vary relatively.

The above-described recording and reproducing apparatus and the information recording medium of Example 11 were used to perform reproduction of information.

| irradiation power (mW) | 0, | 2, | 4, | 7, | 10 |
|---|---|---|---|---|---|
| SNR (dB) | 25.1, | 25.5, | 26.1, | 26.6, | 25.5 |

SNRs nearly equal to those of Example 11 were obtained, but in Example 12, the irradiation power was able to be relatively lowered since the laser light was narrowed. The diameter of the laser light was 0.5 μm.

Example 13

First, two kinds of information recording media were prepared by forming a 20-nm-thick SiN film, a magnetic film made of $Tb_{16}Fe_{84}$ (TM-rich) or a magnetic film made of $Tb_{28}Fe_{72}$ (RE-rich), and a 20-nm-thick SiN film over a substrate in this order, and the magnetic characteristics of the respective information recording media were examined.

The magnetic film was formed using targets having each composition and a known magnetron sputtering apparatus under the conditions of sputtering gas (Ar) pressure: 0.5 Pa and sputtering rate: 30 nm/m.

In the case of the magnetic film made of $Tb_{16}Fe_{84}$, the coercive force at room temperature was 3 kOe, the coercive force at 65° C. was 2 kOe, and the saturation magnetization was 200 emu/cc. In the case of the magnetic film made of $Tb_{28}Fe_{72}$, the coercive force at room temperature was 3 kOe, the coercive force at 65° C. was 4 kOe, and the saturation magnetization was 150 emu/cc.

Figure 8:
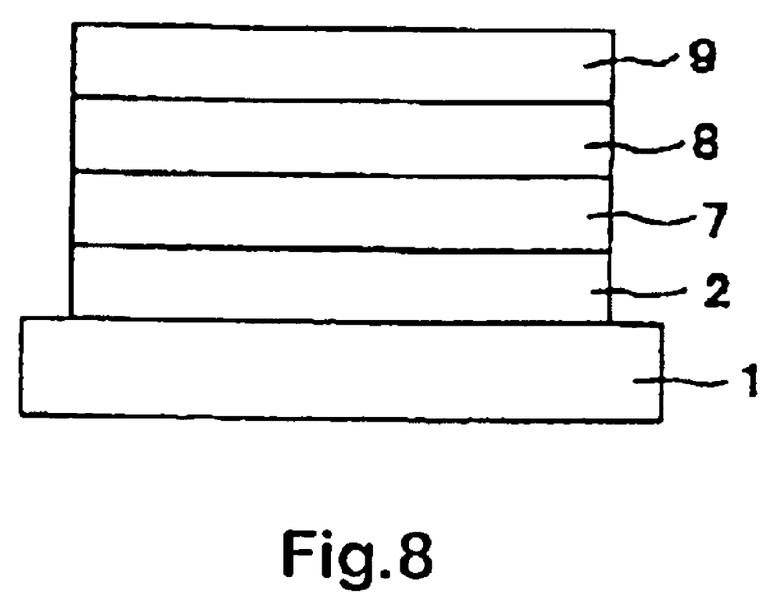
FIG. 8 is a schematic sectional view illustrating an information recording medium according to Example 13 of the present invention.

Then, as shown in FIG. 8, the above-described two kinds of magnetic films were continuously laminated. Specifically, a 20-nm-thick SiN film, a 10-nm-thick NiP film and a 2-nm-thick C film were formed over a substrate 1 in this order, thereby forming a underlying layer 2. Further, a 12-nm-thick magnetic film 7 made of $Tb_{28}Fe_{72}$ and a 32-nm-thick magnetic film 8 made of $Tb_{16}Fe_{84}$ were continuously formed over the C film. After that, a 7-nm-thick protective layer 9 made of SiN and a 3-nm-thick solid lubricating layer made of C (not shown) were formed in this order, whereby an information recording medium both magnetic films were exchange-coupled was obtained.

The obtained information recording medium exhibited a coercive force of about 2.7 kOe and a tBr of 58 Gauss μm at room temperature, and a coercive force of 4 kOe and a tBr of 60 Gauss μm at 65° C.

The above information recording medium was evaluated through recording and reproduction performed with an actual magnetic disk drive in the following manner.

The magnetic disk drive was disposed in a thermo-hygrostat maintained at about 25° C. and recording and reproduction were performed through a merge type GMR head. When a recording current Iw was made about 15 mA, the signal amplitude was saturated, and the O/W characteristic (240 kfci was recorded on 20 kfci) exhibited a good value of −40 dB. SNR at 240 kfci exhibited a value of 21 dB.

In addition, the thermo-hygrostat was maintained at about 65° C. and recording and reproduction were performed through the same merge type GMR head. When the recording current Iw was made about 17 mA, the signal amplitude was saturated, and the O/W characteristic exhibited a good value of −38 dB. SNR at 240 kfci exhibited a value of 21.3 dB.

The signals recorded at room temperature and at 65° C., did not vary at all even after two hours, and SNRs obtained immediately after recording were retained.

Example 14

A TbFeCo film was used as a TM-rich film, and a DyFeCo film was used as an RE-rich film. Specifically, an information recording medium was obtained in a manner similar to that used in Example 13, except that a $Tb_{15}Fe_{75}Co_{10}$ film (Hc=2.7 kOe, Ms=200 emu/cc, film thickness=40 nm) and a $Dy_{29}Fe_{61}Co_{10}$ film (Hc=2.5 kOe, Ms=130 emu/cc, film thickness=10 nm) were employed. The information recording medium exhibited a coercive force of about 3.1 kOe and a tBr of 84 Gauss μm at room temperature, and a coercive force of 3.2 kOe at 40° C. and a coercive force of 4 kOe at 65° C.

Accordingly, at both of room temperature and 65° C., a magnetic field of approximately 3.4 kOe sufficed to magnetically record information on this medium, and the recorded information did not disappear.

Moreover, the recording characteristics of the information recording medium and the stability of recorded data were examined with a magnetic disk drive similar to that used in Example 13, and the O/W characteristic was a good value of −38 dB and an SNR of 22 dB was obtained at 240 kfci. In addition, when two hours passed after recording, the SNR was 22 dB and the signal did not deteriorate.

Example 15

An information recording medium was obtained in a manner similar to that used in Example 13, except that a $Dy_{20}Fe_{50}CO_{30}$ film (of thickness 20 nm) was employed as a TM rich film and a $Tb_{28}Fe_{60}Co_{12}$ film (of thickness 40 nm) was employed as an RE rich film. The information recording medium exhibited a coercive force of about 2.7 kOe and a tBr of 72 Gauss μm at room temperature. The coercive force at 40° C. was 2.9 Oe, and the coercive force at 65° C. was 3.1 kOe.

In addition, when two hours passed after recording, the SNR was 0.8 dB and the signal merely deteriorated to a slight extent.

Example 16

Information recording media were formed in a manner similar to that used in Example 13, except that the periods of the regular depressions and projections of NiP films constituting their underlying layers were changed in the following manner. The periods of the regular depressions and projections were adjusted by changing applied sputtering power. The tBrs of the magnetic films were 58 Gauss $\mu$m, similarly to that in Example 13. The SNRs of the obtained information recording media at 240 kfci were measured. The results are shown below.

| applied power (KW): | 0.4, | 0.7, | 1.0, | 1.4, | 2.1, | 2.9 |
|---|---|---|---|---|---|---|
| irregularity period (nm): | 6, | 10, | 20, | 30, | 40, | 50 |
| SNR (dB): | 15.0, | 19.4, | 21.0, | 21.3, | 21.2, | 15.4 |

From the above results, it has been found that a more preferable SNR can be obtained when the period of regular depressions and projections is approximately 10–40 nm.

Example 17

Information recording media were formed in a manner similar to that used in Example 13, except that the Ra values of the regular depressions and projections of NiP films constituting their underlying layers were changed in the following manner. Ra of the regular depressions and projections were adjusted by changing the NiP films. The tBrs of the magnetic films were 58 Gauss $\mu$m, similarly to that in Example 13. The SNRs and O/W characteristics at 240 kfci of the obtained information recording media were measured. The results are shown below.

| thickness of NiP film (nm): | 0, | 8, | 10, | 20, | 30, | 40, | 50, | 60, | 70, | 80 |
|---|---|---|---|---|---|---|---|---|---|---|
| Ra (nm): | 0.05, | 0.10, | 0.15, | 0.23, | 0.55, | 0.73, | 0.90, | 1.20, | 1.50, | 1.70 |
| SNR (dB): | 14.5, | 19.2, | 21.0, | 21.3, | 21.2, | 22.0, | 21.5, | 19.0, | 18.3, | 12.8 |
| O/W (dB): | −10, | −32, | −40, | −41, | −41, | −40, | −43, | −42, | −35, | −12 |

From the above results, it has been found that a more preferable SNR can be obtained when Ra is approximately 0.1–1.5 nm.

Example 18

Information recording media were formed in a manner similar to that used in Example 14, except that the thickness of the TbFeCo film and that of the DyFeCo film were changed in the following manner. The SNRs and tBrs of the obtained information recording media were measured. The results are shown below.

| TbFeCo (nm): | 90, | 80, | 60, | 50, | 40, | 30, | 29, | 27, | 25, | 20, | 20, | 20 |
|---|---|---|---|---|---|---|---|---|---|---|---|---|
| DyFeCo (nm): | 10, | 10, | 10, | 10, | 10, | 10, | 10, | 10, | 10, | 10, | 25, | 27 |
| tBr (Gauss $\mu$m): | 210, | 184, | 134, | 109, | 59, | 57, | 56, | 52, | 46, | 33, | 27, | 6 |
| SNR (dB): | 19, | 21, | 22, | 23, | 22, | 22, | 21, | 16, | 14, | 10, | 5, | 1 |

From the above results, it has been found that a preferable SNR can be obtained if tBr is 55 Gauss $\mu$m or more. Moreover, it has been found out that the range of 57–134 Gauss $\mu$m is more preferable.

The information recording medium according to the present invention can record information at an ultra high density while stabilizing very small recording marks and reproduce the recorded information with an exciting existing magnetic reproducing.

What is claimed is:

1. An information recording medium comprising an information recording film made of an exchange-coupled multilayer film capable of magnetically reproducing a recorded information, wherein the exchange-coupled multilayer film has a coercive force which is not substantially changed at a temperature ranging from room temperature to approximately 65° C., the product of 55 Gauss $\mu$m or more of a remnant magnetic flux density and a film thickness, and includes at least a transition metal-rich rare earth-transition metal amorphous alloy layer and a rare earth-rich rare earth-transition metal amorphous layer.

2. An information recording medium according to claim 1, wherein the exchange-coupled multilayer film is formed on a base on which regular depressions and projections having Ra of 0.1 to 1.5 nm, a period of 10 to 40 nm or both of them have been formed.

3. An information recording medium according to claim 1, wherein rare earth-transition metal amorphous alloy is TbFe, TbFeCr, TbFeCo, DyFeCo, GdCo, GdFe, TbCo, GdTbFe, GdTbFeCo or GdDyFeCo.

4. An information recording medium according to claim 1, wherein the transition metal-rich rare earth-transition metal amorphous alloy layer and the rare earth-rich rare earth-transition metal amorphous layer contain at least Tb or Dy.

5. A slider for recording and reproducing information used for recording or reproducing on or from an information recording medium according to claim 1, the slider comprising a light irradiating means, a recording head and a magnetic reproducing head that are integrated, the light irradiating means being located ahead of the recording head and the magnetic reproducing head in the direction of information recording and reproducing.

* * * * *